(12) United States Patent
Liu et al.

(10) Patent No.: US 7,490,643 B2
(45) Date of Patent: *Feb. 17, 2009

(54) WORKTABLE HAVING SLIDABLE BOARD

(75) Inventors: Chia-Sheng Liu, Chiayi County (TW); Yuan-Chih Ting, Taichung County (TW)

(73) Assignee: Durq Machinery Corp., Taichung (TW)

( * ) Notice: Subject to any disclaimer, the term of this patent is extended or adjusted under 35 U.S.C. 154(b) by 357 days.

This patent is subject to a terminal disclaimer.

(21) Appl. No.: 11/385,756

(22) Filed: Mar. 22, 2006

(65) Prior Publication Data

US 2007/0113928 A1    May 24, 2007

(30) Foreign Application Priority Data

Nov. 21, 2005   (TW) .............................. 94220153 U

(51) Int. Cl.
*B25H 1/14*         (2006.01)

(52) U.S. Cl. .................... 144/286.5; 144/287; 83/477.2; 108/143

(58) Field of Classification Search .............. 144/286.1, 144/286.5, 287, 285; 83/469, 477, 477.2, 83/474–476, 437.1; 108/102, 143
See application file for complete search history.

(56) References Cited

U.S. PATENT DOCUMENTS

| | | | | |
|---|---|---|---|---|
| 5,201,863 | A * | 4/1993 | Peot ............................ | 83/432 |
| 6,189,429 | B1 * | 2/2001 | Liu ............................. | 83/477 |
| 6,508,281 | B1 * | 1/2003 | Wang .......................... | 144/287 |
| 6,817,275 | B1 * | 11/2004 | Chin-Chin ................ | 83/435.11 |
| 7,240,706 | B2 * | 7/2007 | Liu et al. ................. | 144/286.5 |
| 2007/0284017 | A1 * | 12/2007 | Liu et al. ................. | 144/286.5 |

* cited by examiner

*Primary Examiner*—Shelley Self
(74) *Attorney, Agent, or Firm*—Bacon & Thomas, PLLC

(57) ABSTRACT

A worktable includes a base supporting a main table and an auxiliary table, two guide rods slidably supported on the auxiliary table, a sliding board slidably supported on the guide rods, a linking mechanism having a linking rod affixed to the bottom wall of the sliding board for carrying the guide rods to move with the sliding board when the sliding board is moved from a first direction to a second direction reversed to the first direction.

7 Claims, 14 Drawing Sheets

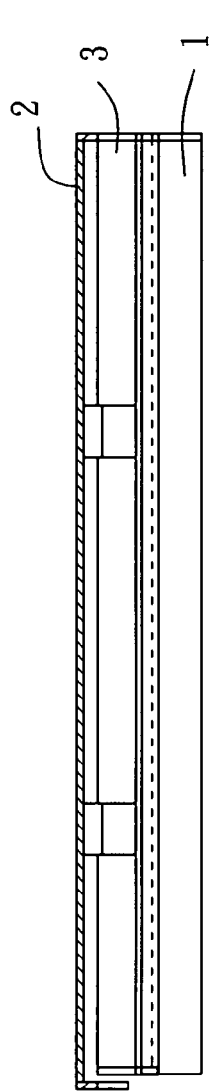
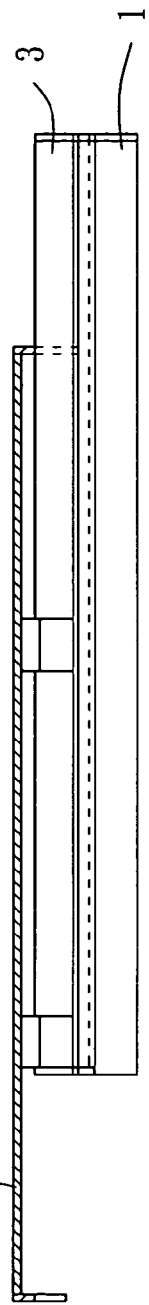
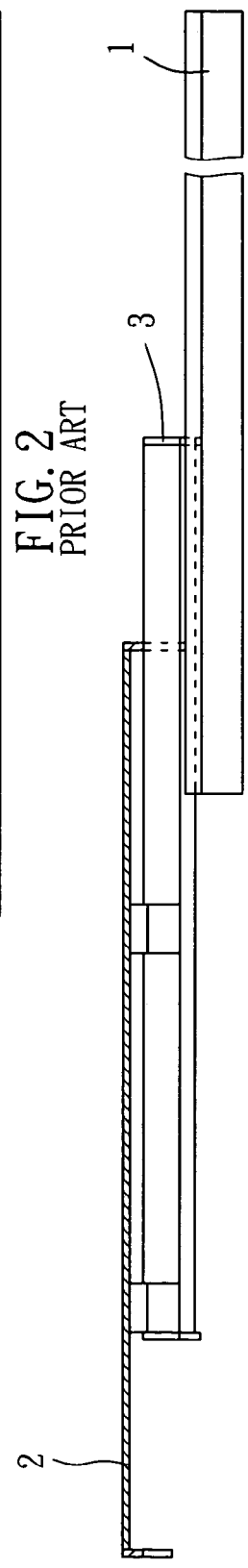
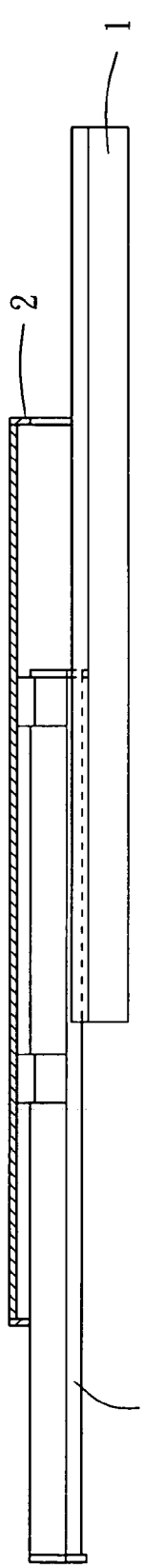
FIG. 1 PRIOR ART
FIG. 2 PRIOR ART
FIG. 3 PRIOR ART
FIG. 4 PRIOR ART

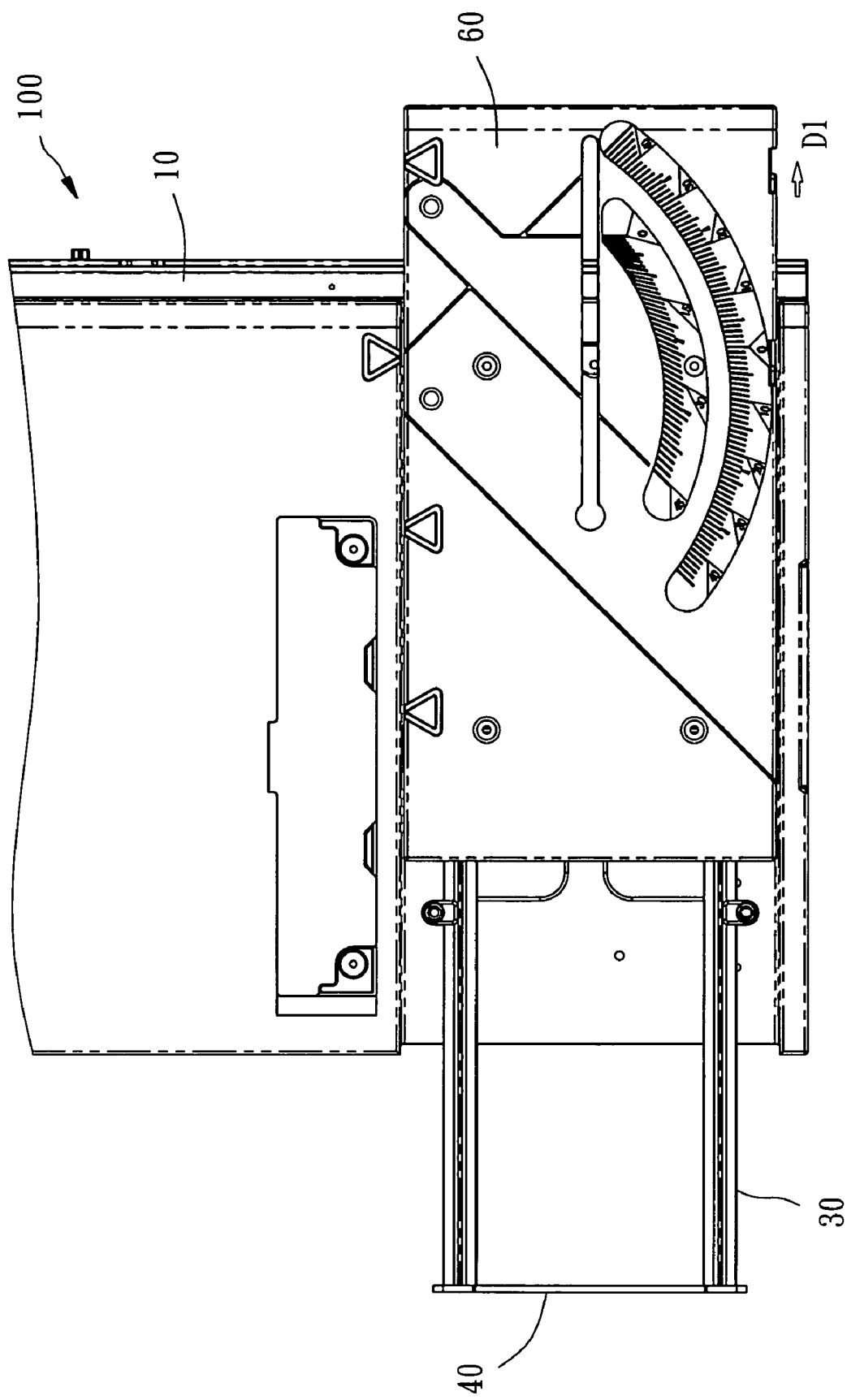

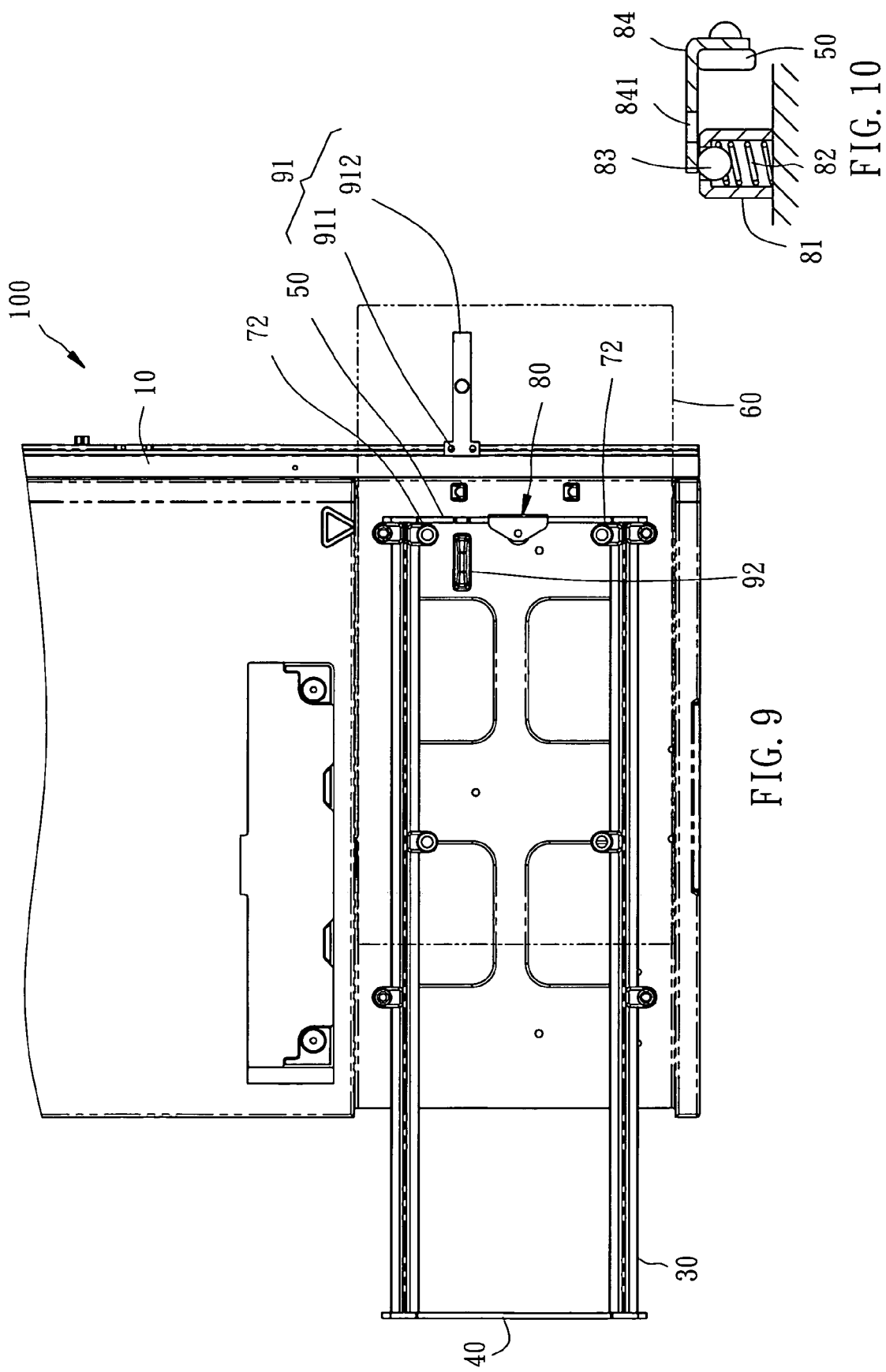

WORKTABLE HAVING SLIDABLE BOARD

BACKGROUND OF THE INVENTION

1. Field of the Invention

The present invention relates to a worktable for use in, for example, a table saw and more particularly, to a worktable that has a sliding board that can be moved in steps to extend the workpiece supporting area.

2. Description of the Related Art

Referring to FIGS. 1-3, a conventional extendable worktable is shown comprising a main table 1, a first table extension 2, and a second table extension 3. The first table extension 2 can be moved outwards to a certain distance relative to the main table 1, as shown in FIG. 2, and then the second table extension 3 that is disposed below the first table extension 2 will be moved outwards with the first table extension 2 relative to the main table 1, as shown in FIG. 3, thereby extending the workpiece supporting area of the worktable.

When wishing to receive the worktable from the extended position shown in FIG. 3 to the received position shown in FIG. 1, the user must reverse the first table extension 2 from the position shown in FIG. 3 to the position shown in FIG. 4 and then keep moving the first table extension to the position shown in FIG. 1 and then push the second table extension to the position shown in FIG. 1. When the worktable is in the position shown in FIG. 4, the second table extension 3 protrudes over one side of the main table 1, causing an inconvenience and interference to the user in working.

Further, when moving the first table extension 2 from the position shown in FIG. 1 toward the position shown in FIG. 2, the second table extension 3 may be carried outwards with the first table extension 2 erroneously due to a friction resistance between the first table extension 1 and the second table extension 2.

Therefore, it is desirable to provide an extendable worktable that eliminates the aforesaid drawbacks.

SUMMARY OF THE INVENTION

The present invention has been accomplished under the circumstances in view. It is one object of the present invention to provide a worktable that eliminates the drawbacks of the aforesaid prior art design.

According to the present invention, the worktable comprises a base; at least one first guide rail affixed to the base and provide with a guide groove, a first stop portion, and a second stop portion; at least one guide rod slidably coupled to the guide groove of the at least one first guide rail and axially movable in a first direction and a second direction reversing to the first direction, each guide rod having a first end and a second end; a first end plate fixedly connected to the first end of the guide rod for stopping against the first stop portion of the at least one guide rod to prohibit displacement of the at least one guide rod in the first direction; a second end plate fixedly connected to the second end of the guide rod for stopping against the second stop portion of the at least one guide rod to prohibit displacement of the at least one guide rod in the second direction; a sliding board slidably supported on the at least one guide rod, the sliding board having a bottom wall; at least one second guide rail affixed to the bottom wall of the sliding board, the second guide rail having a guide groove for receiving the guide rod, a first push portion for stopping against the second end plate for enabling the at least one guide rod to be carried in the first direction when the sliding board is moved by an external force in the first direction, and a second push portion for stopping against the first end plate for enabling the at least one guide rod to be carried in the second direction when the sliding board is moved by an external force in the second direction; and a linking mechanism having a linking rod affixed to the bottom wall of the sliding board for stopping against the second end plate to move the at least one guide rod in the second direction when the sliding board is moved by an external force from the first direction toward the second direction.

BRIEF DESCRIPTION OF THE DRAWINGS

FIG. 1 is a schematic sectional view showing a received status of a conventional extendable worktable.

FIG. 2 is a schematic sectional view of the prior art extendable worktable, showing the first table extension moved outwards relative to the second table extension and the main table.

FIG. 3 is a schematic sectional view of the prior art extendable worktable, showing the first table extension and the second table extension extended out FIG. 4 is a schematic sectional view showing the prior art extendable worktable.

FIG. 7 is an enlarged view of a part of the worktable according to the first embodiment of the present invention.

FIG. 8 is another top view of the worktable according to the first embodiment of the present invention.

FIG. 9 is still another top view of the worktable according to the first embodiment of the present invention.

FIG. 10 is an enlarged view of a part of the worktable according to the first embodiment of the present invention.

DETAILED DESCRIPTION OF THE INVENTION

Figure 5:
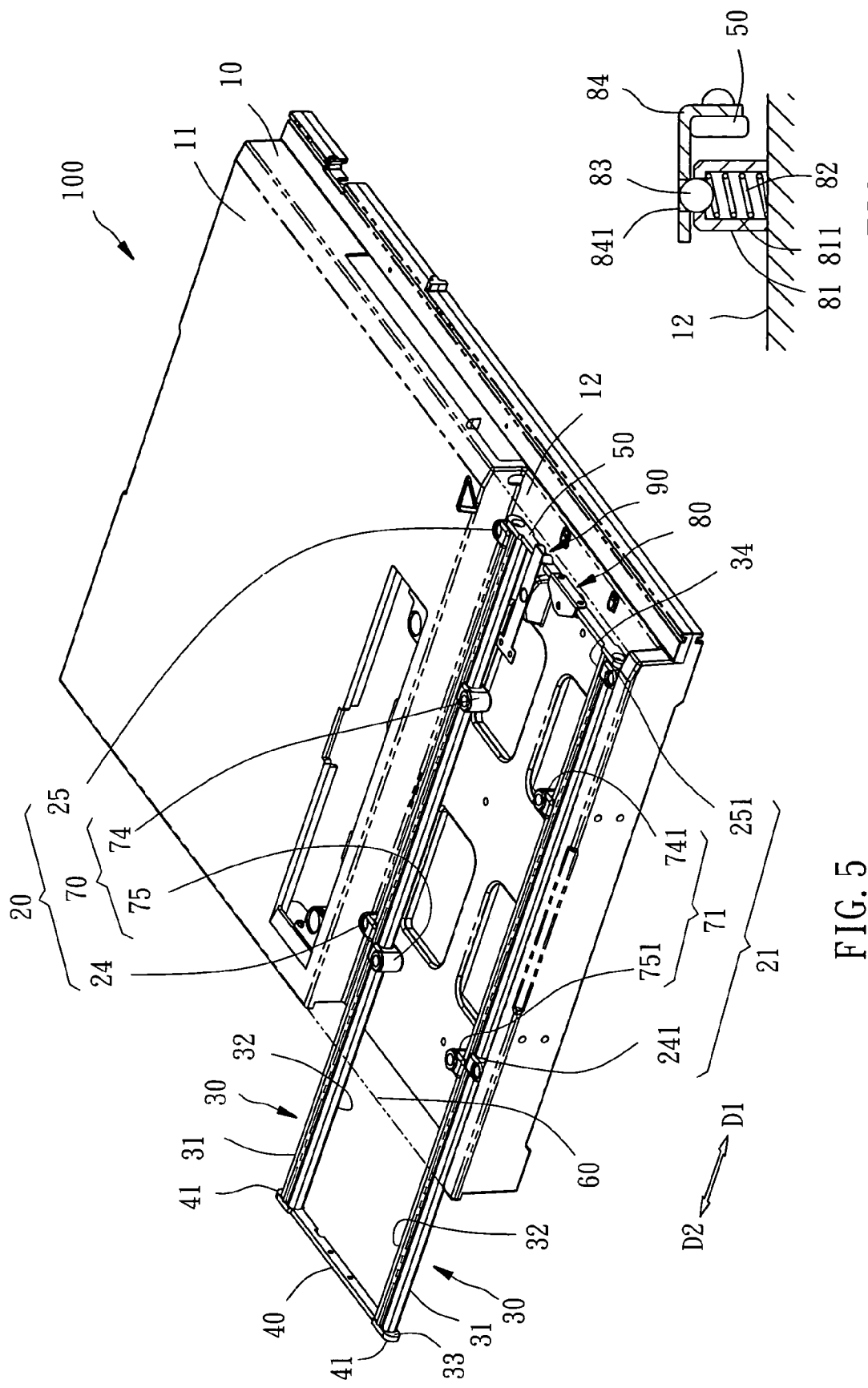
FIG. 5 is a perspective view of a worktable in accordance with a first embodiment of the present invention.

Referring to FIGS. 5-19, a worktable 100 in accordance with a first embodiment of the present invention for use in a sawing machine (not shown) comprises a base 10, two first guide rails 20, two guide rods 30, a first end plate 40, a second end plate 50, a sliding board 60, two second guide rails 70, a brake 80, and a linking mechanism 90.

The base 10 has a main table 11 and an auxiliary table 12. The elevation of the top surface of the auxiliary table 12 is slightly lower than the elevation of the top surface of the main table 11.

The two first guide rails 20 are respectively affixed to two opposite sides of the auxiliary table 12 of the base 10, each having a guide groove 21, a first stop portion 22, and a second stop portion 23. According to this embodiment, each first guide rail 20 is comprised of a first locating block 24 and a second locating block 25. The first locating block 24 has a groove 241. The second locating block 25 has a groove 251. The grooves 241 and 251 construct the aforesaid guide groove 21. The first locating block 24 has one sidewall that forms the aforesaid first stop portion 22. The second locating block 25 has one sidewall that forms the aforesaid second stop portion 23.

The two guide rods 30 each are comprised of a first rod element 31 and a second rod element 32. The first rod element 31 is coupled to the first guide groove 21 of one first guide rail 20, and axially movable between a first direction D1 and a second direction D2 that is reversed to the first direction D1. Each guide rod 30 further has a first end 33 and a second end 34.

The first end plate 40 is fixedly connected between the first ends 33 of the two guide rods 30. The second end plate 50 is fixedly connected between the second ends 34 of the two guide rods 30. The first end plate 40 and the second end plate 50 form a rigid frame. Further, the first end plate 40 has a lug 41 at each of the two distal ends thereof, and the second end plate 50 has a lug 51 at each of the two distal ends thereof.

The sliding board 60 has a size approximately equal to the area of the auxiliary table 12 of the base 10.

The two second guide rails 70 are respectively affixed to the bottom wall of the sliding board 60, each comprising a guide groove 71, a first push portion 72 and a second push portion 73. According to this embodiment, each second guide rail 70 is comprised of a first sliding block 74 and a second sliding block 75. The first sliding block 74 has a groove 741. The second sliding block 75 has a groove 751. The grooves 741 and 751 of the first sliding block 74 and second sliding block 75 of each second guide rail 70 construct the guide groove 71 of the respective second guide rail 70. The guide grooves 71 of the two second guide rails 70 receive the second rod elements 32 of the guide rods 30 respectively, allowing the sliding board 60 to be slidably supported on the second guide rods 30. Further, the first sliding block 74 has one sidewall that forms the first push portion 72 of the respective second guide rail 70, and the second sliding block 75 has one sidewall that forms the second push portion 73 of the respective second guide rail 70.

Referring to FIG. 7, the brake 80 is comprised of a holder base 81, a spring 82, a stop member 83, and a retaining member 84. The holder base 81 is a cylindrical member fixedly fastened to the auxiliary table 12 of the base 10 at a predetermined location, defining a receiving hole 811. The spring 82 is mounted in the receiving hole 811 of the holder base 81. The stop member 83 is a steel ball supported on the spring 82 in the receiving hole 811 and partially forced out of the receiving hole 811 by the spring 82. The retaining member 84 is fixedly fastened to the second end plate 50, having a retaining hole 841.

Figure 16:
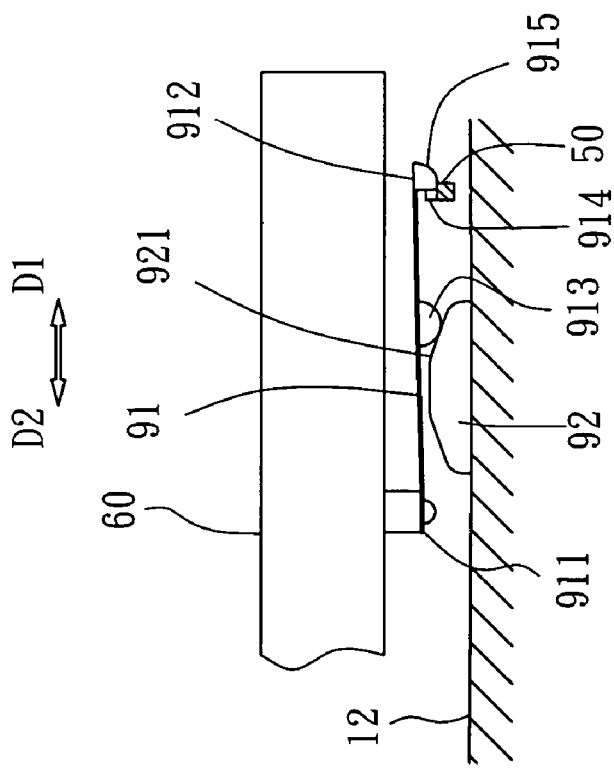
FIG. 16 is a schematic drawing of a part of the first embodiment of the present invention, showing the action of the linking mechanism.

Referring to FIG. 16, the linking mechanism 90 comprises a linking rod 91 and a protruding block 92. The linking rod 91 has a rear end 911, a front end 912, and a protruding portion 913 downwardly protruded from the periphery and spaced between the rear end 911 and the front end 912. The rear end 911 is fixedly connected to the bottom wall of the sliding board 60. The front end 912 is a hooked end having a hooked surface portion 914 facing the second direction D2 and an arched guide surface portion 915 facing the first direction D1. The protruding block 92 is affixed to the top surface of the auxiliary table 12 of the base 10 corresponding to the linking rod 91, having a sloping top surface 921.

After understanding of the component parts of the worktable 100 and their relationship, the use of the worktable 100 is outlined hereinafter.

Figure 6:
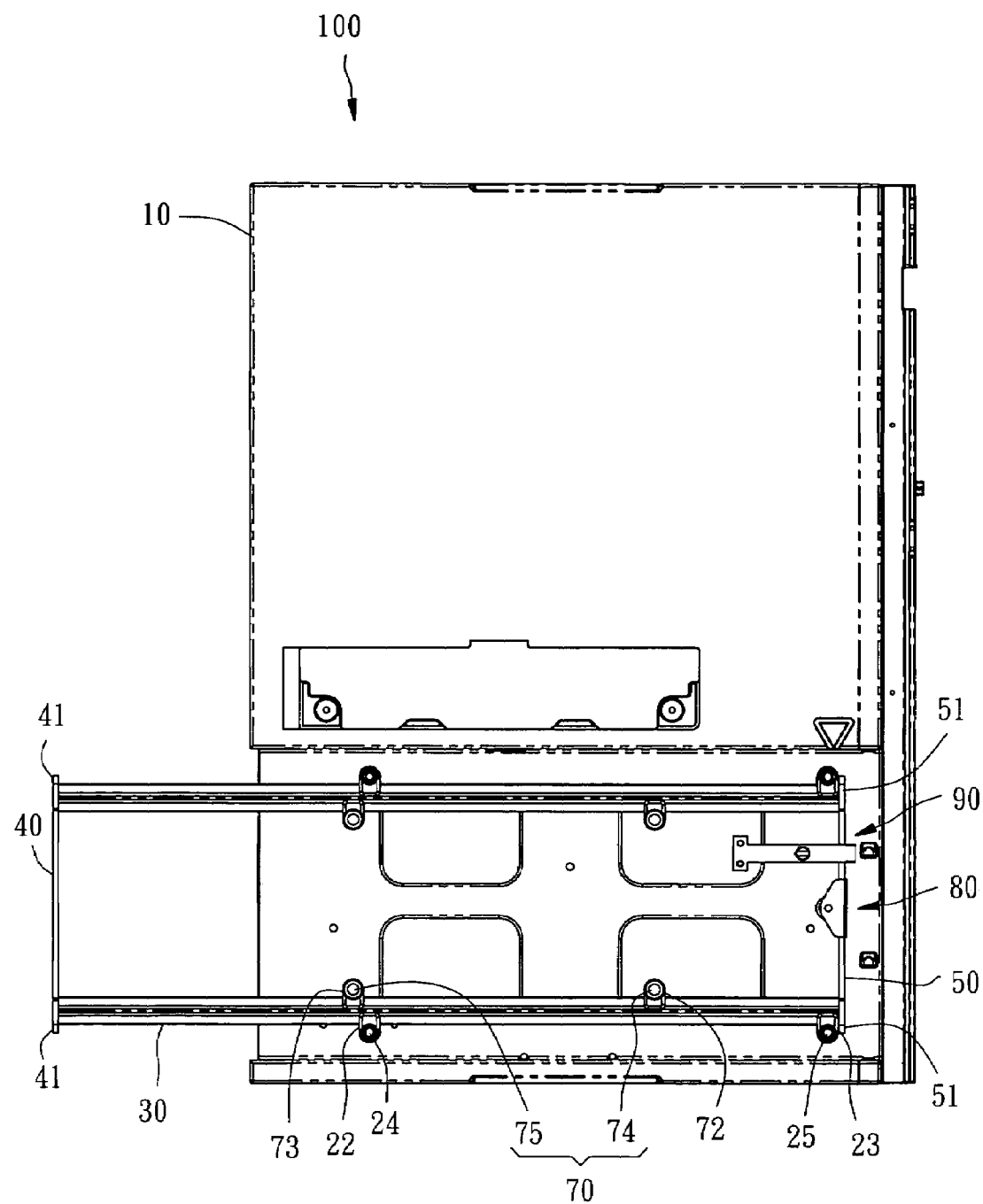
FIG. 6 is a top view of the worktable according to the first embodiment of the present invention.

Referring to FIGS. 5-7, when the sliding board 60 is not pushed, the lugs 51 of the second end plate 50 are respectively stopped against the second stop portions 23 of the first guide rails 20, and the stop member 83 of the brake 80 is forced by the spring 82 to partially engage into the retaining hole 841 of the retaining member 84, and therefore the guide rods 30 and the sliding board 60 are firmly retained to the base 10 against displacement.

Referring to FIG. 8, when the user pushes the sliding board 60 in the first direction D1 to the position where the first push portions 72 of the two second guide rails 70 are respectively stopped against the second end plate 50, an extended workpiece supporting surface area is obtained. Because the stop member 83 is kept partially engaged into the retaining hole 841 of the retaining member 84, the guide rods 30 are kept in the original position.

Figure 11:
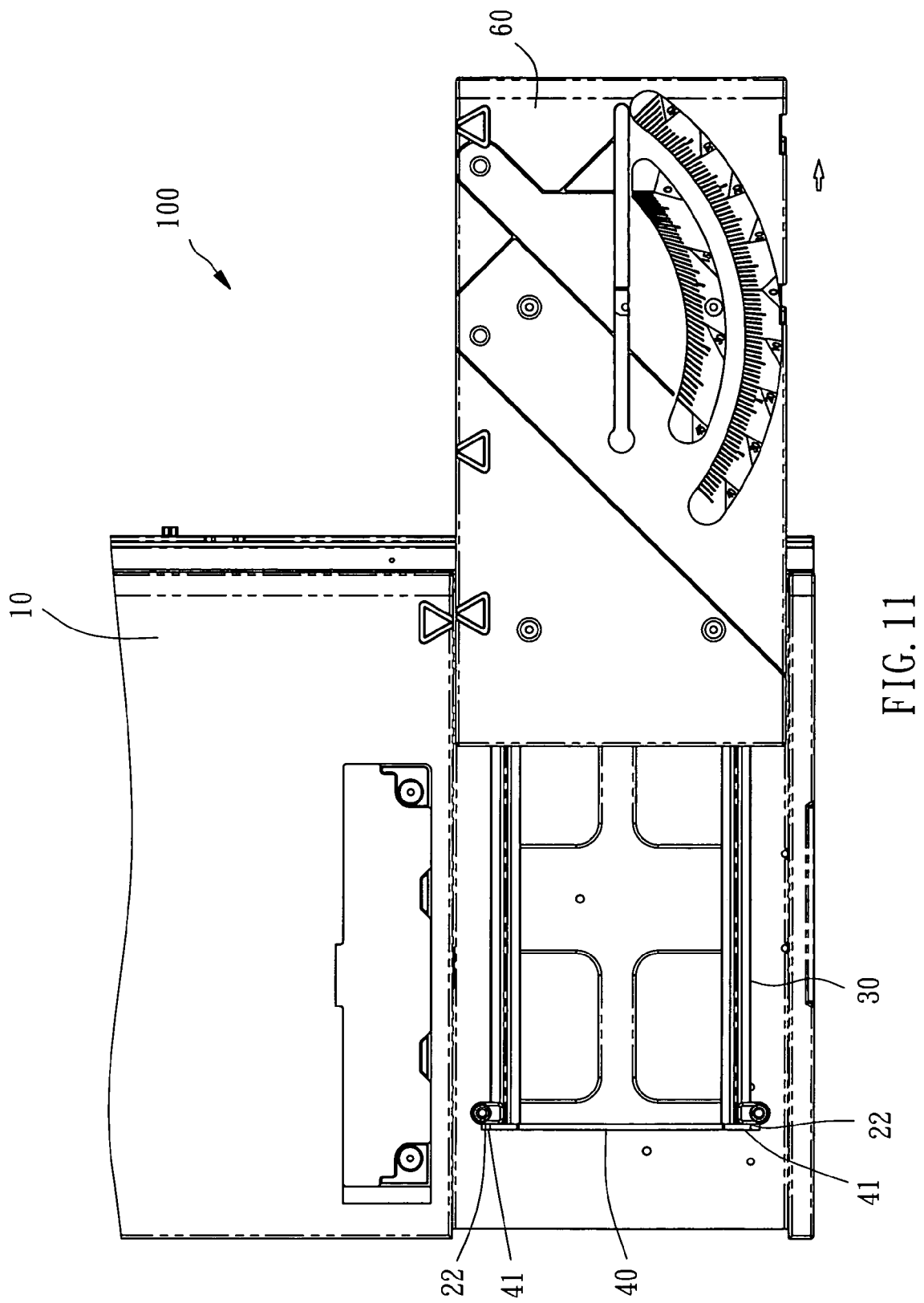
FIG. 11 is still another top view of the worktable according to the first embodiment of the present invention.
Figure 12:
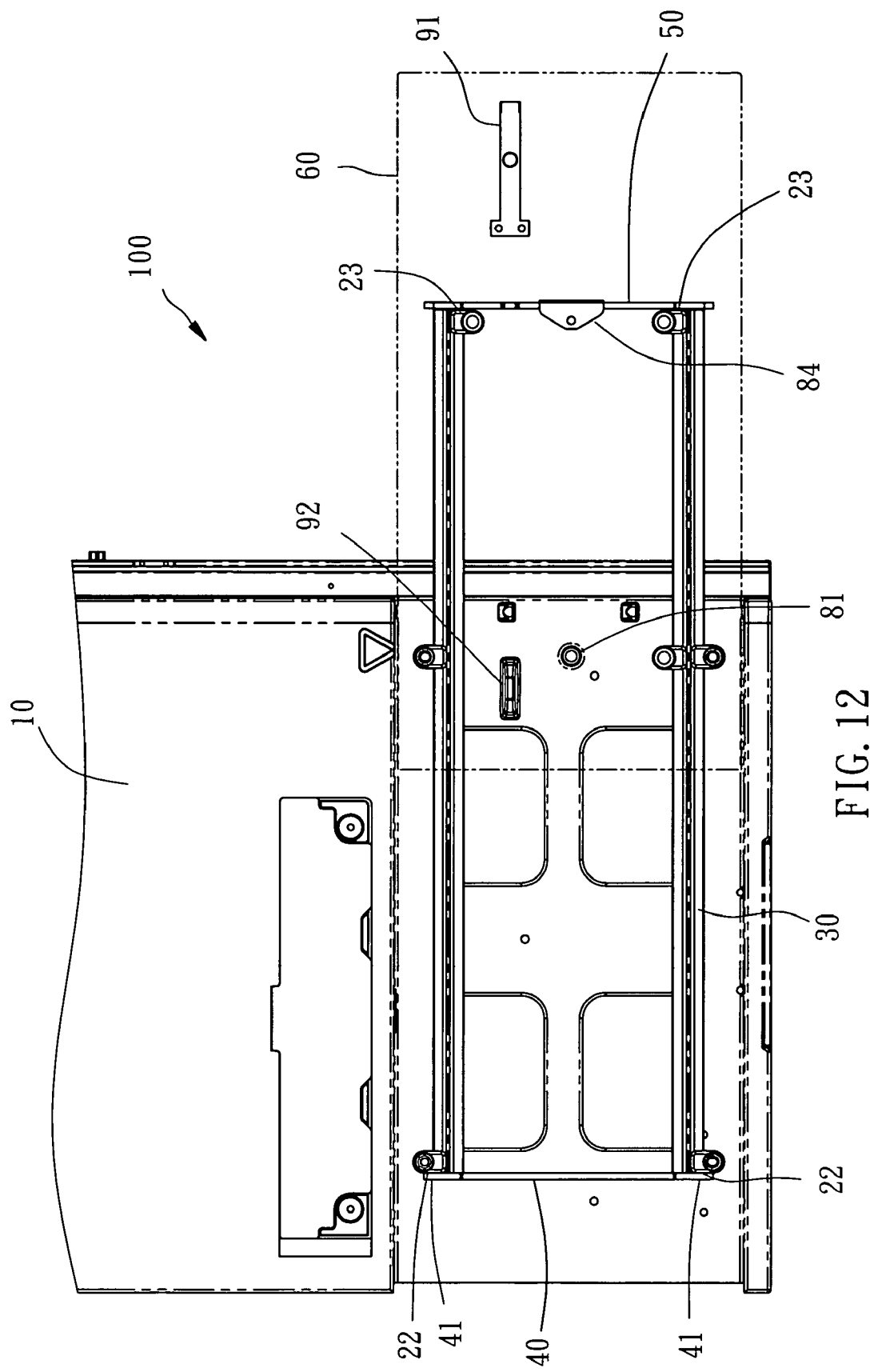
FIG. 12 is still another top view of the worktable according to the first embodiment of the present invention.

When the user keeps moving the sliding board 61 in the first direction D1, as shown in FIGS. 9 and 10, the applied force from the user conquers the spring power of the spring 82 to force the retaining member 84 over the stop member 83, thereby causing the first push portions 72 of the second guide rails 70 that are fixedly provided at the bottom wall of the sliding board 60 to push the second end plate 50 and the guide rods 30 in the first direction D1 to the position where the lugs 41 of the first end plate 41 are respectively stopped against the first stop portions 22 of the first guide rails 20 as shown in FIGS. 11 and 12. By means of displacement of the guide rods 30, the maximum extended workpiece supporting area is obtained.

Figure 13:
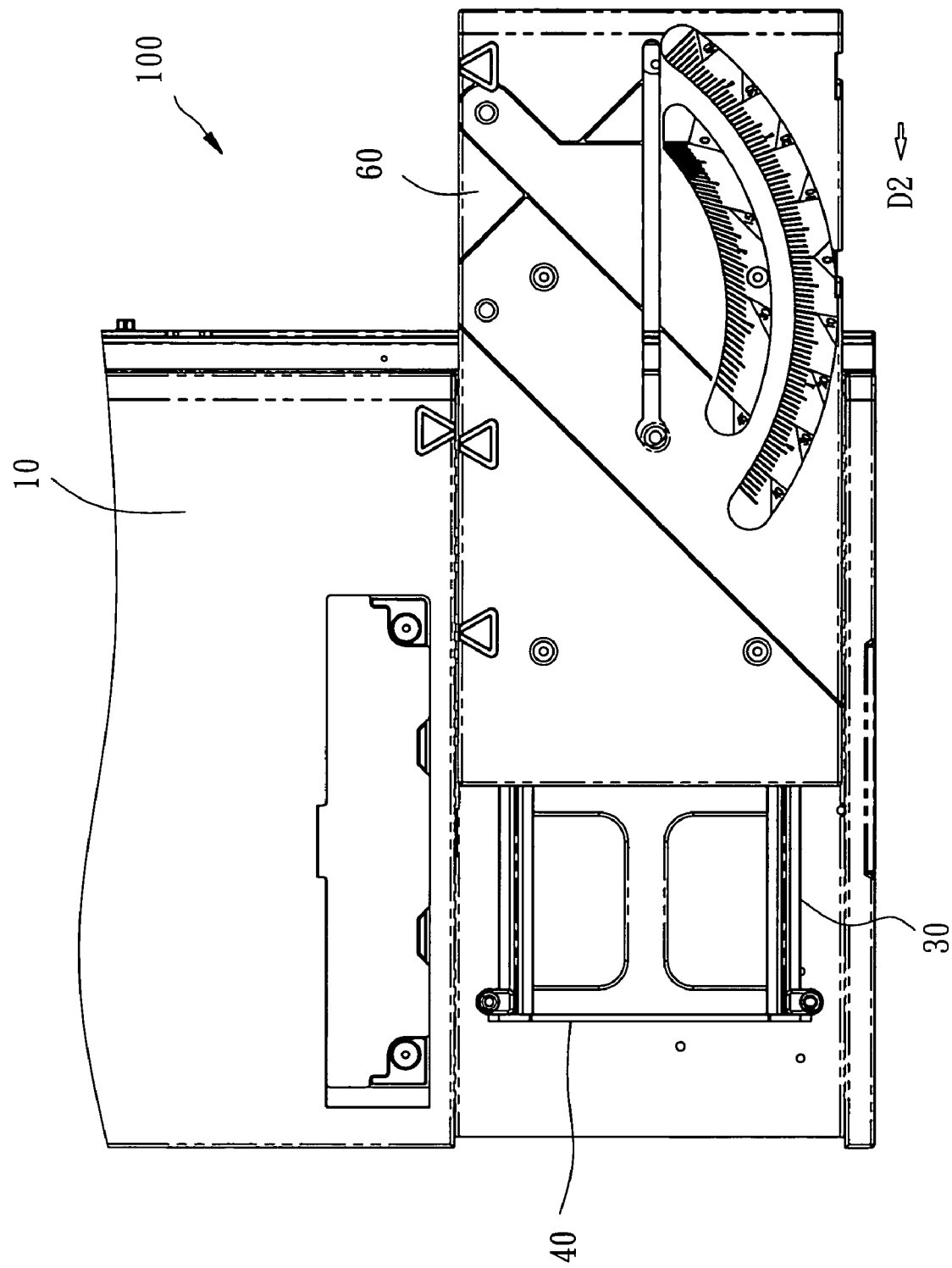
FIG. 13 is still another top view of the worktable according to the first embodiment of the present invention.
Figure 14:
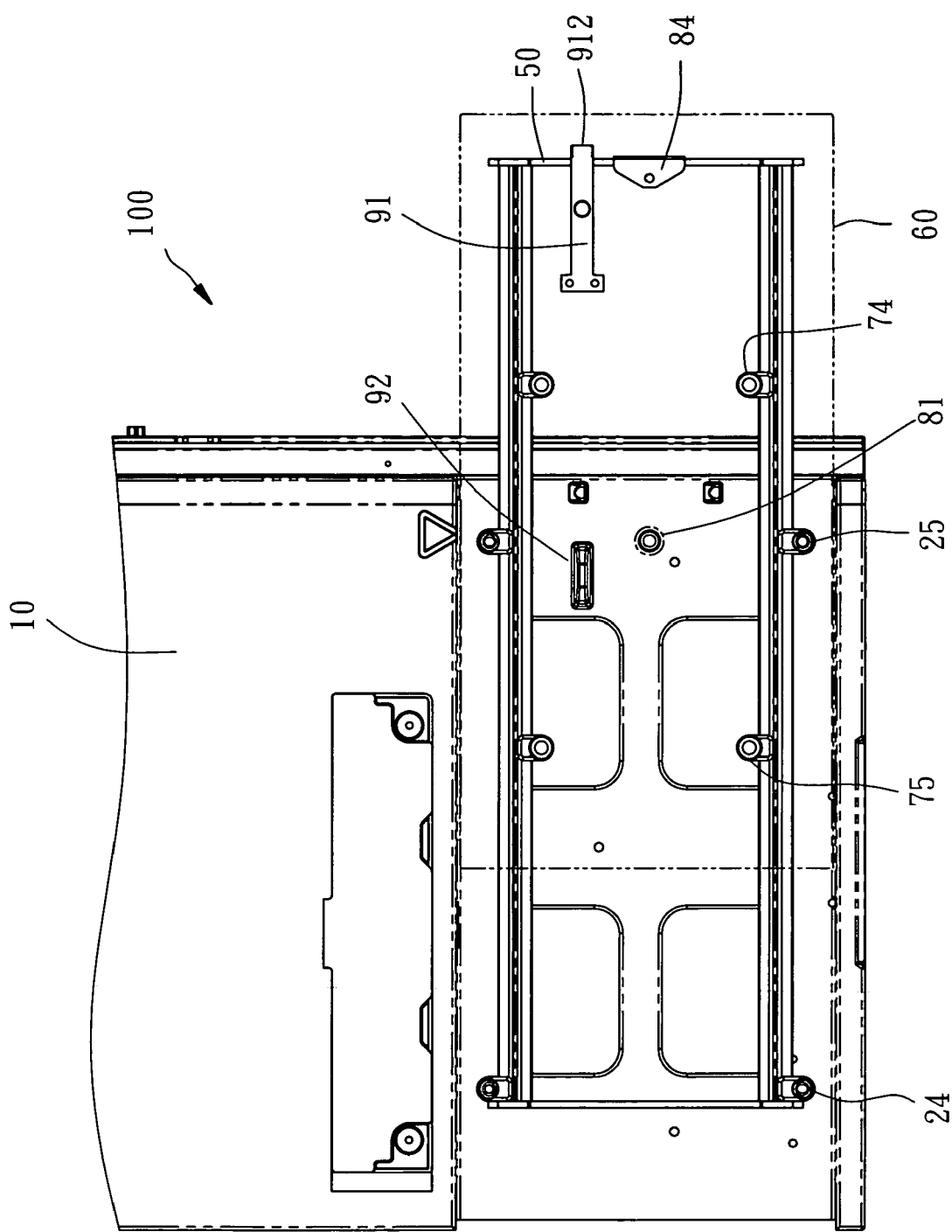
FIG. 14 is still another top view of the worktable according to the first embodiment of the present invention.
Figure 15:
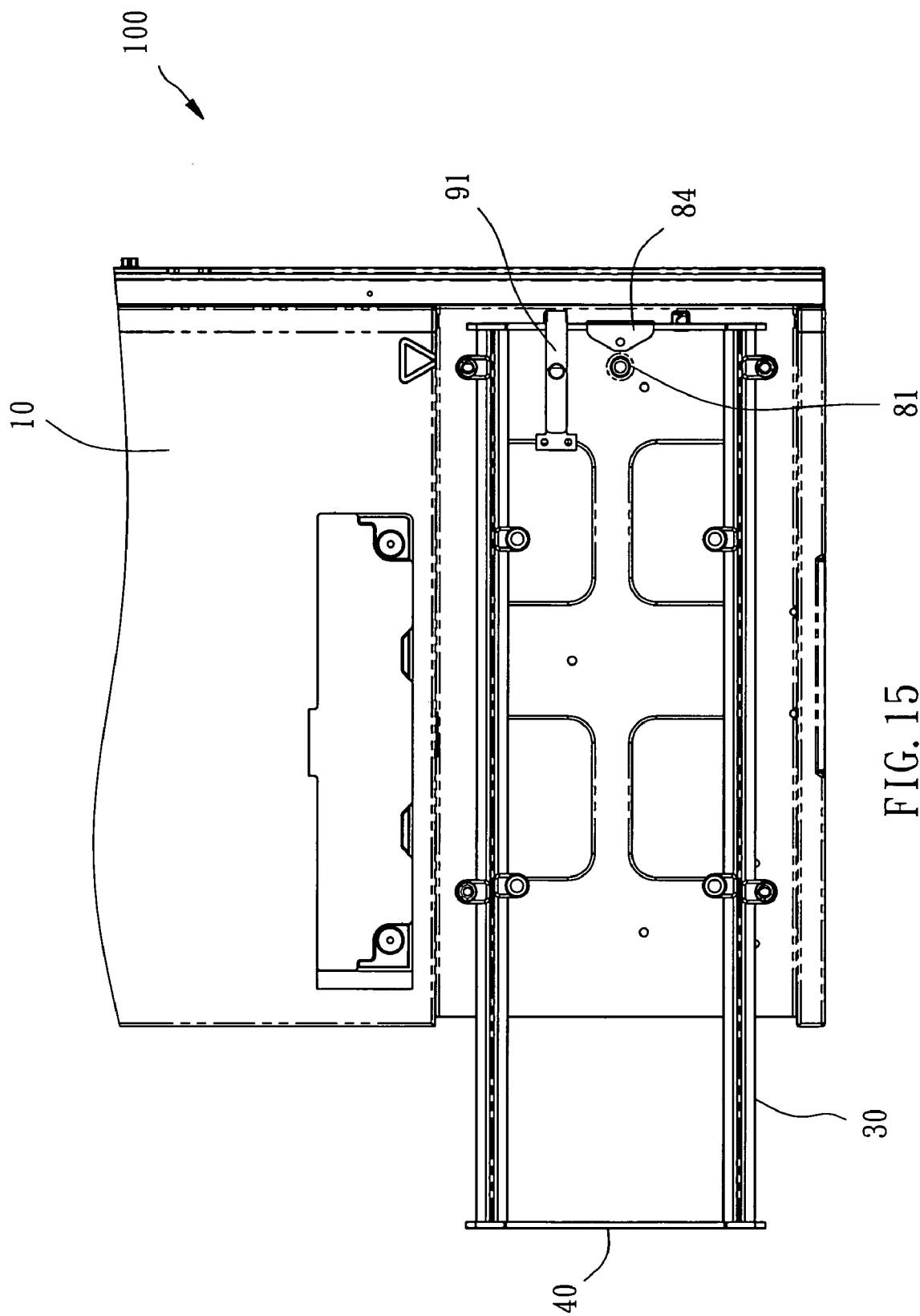
FIG. 15 is still another top view of the worktable according to the first embodiment of the present invention.
Figure 17:
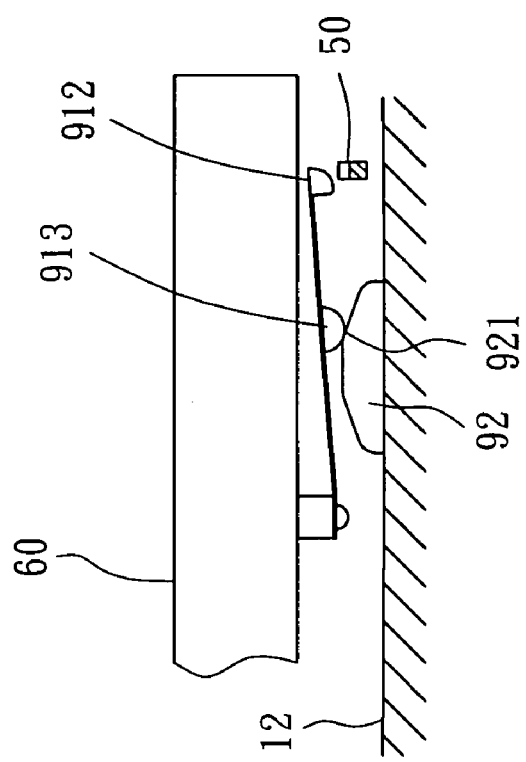
FIG. 17 is similar to FIG. 16 but showing the front end of the linking rod lifted.
Figure 18:
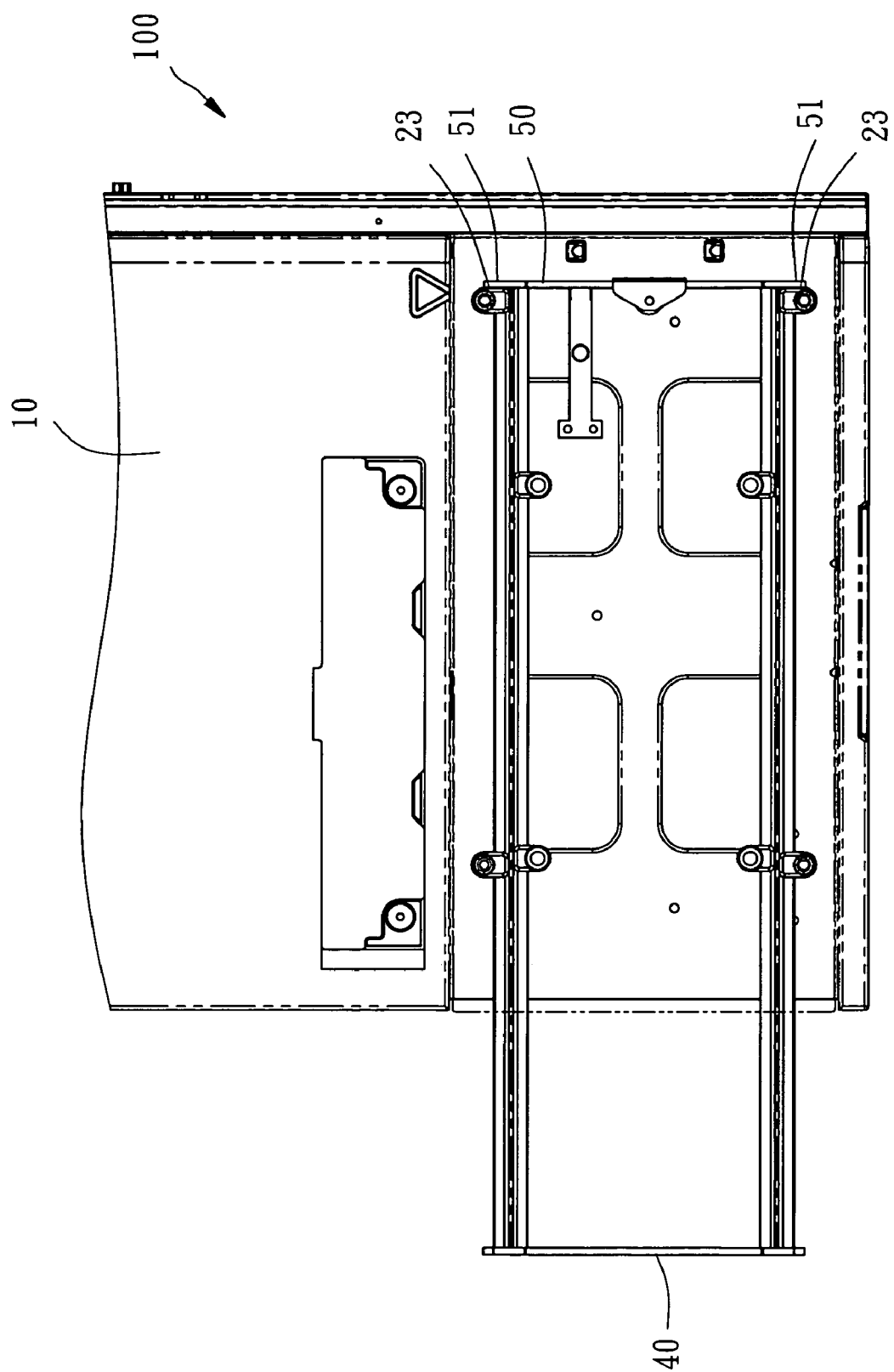
FIG. 18 is still another top view of the worktable according to the first embodiment of the present invention.
Figure 19:
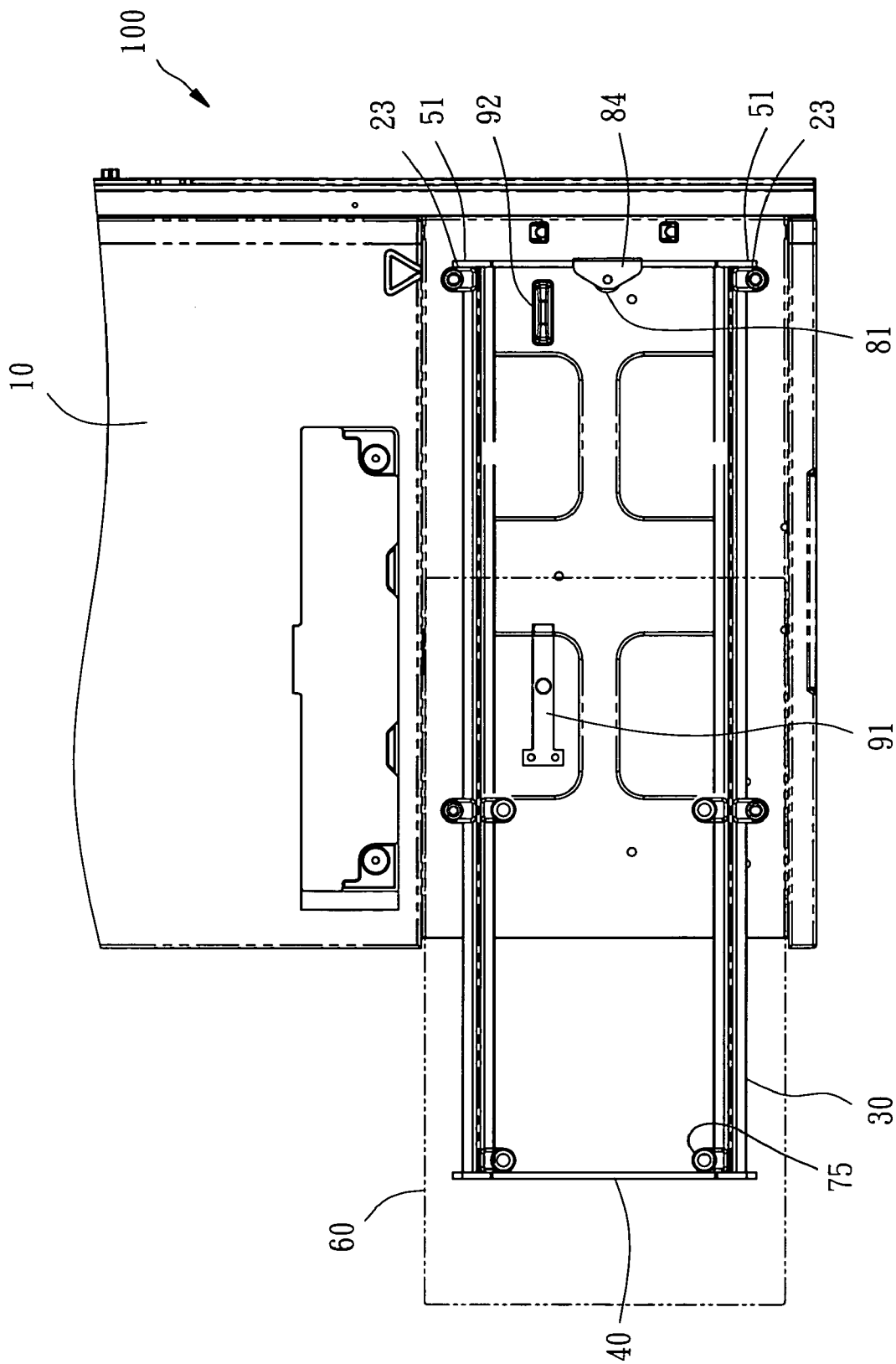
FIG. 19 is still another top view of the worktable according to the first embodiment of the present invention.

FIGS. 13 and 14 show the sliding board 60 moved from the limited position in the first direction shown in FIGS. 11 and 12 toward the second direction D2 to a distance. At this time, the hooked surface portion 914 of the linking rod 91 is hooked on one side of the second end plate 50. FIGS. 15 and 16 show the sliding board 60 continuously moved in the second direction D2 and the guide rods 30 synchronously carried by the linking rod 91 in the second direction D1 to the extent that the lugs 51 of the second end plate 50 are respectively stopped at the second stop portions 23 of the first guide rails 20. During sliding movement of the sliding board 60 with the guide rods 30 toward the second direction D2, the protruding portion 913 of the linking rod 91 is stopped against the sloping top surface 921 of the protruding block 92 to guide movement of the linking rod 91 along the sloping top surface 921 of the protruding block 92, thereby causing the front end 912 of the linking rod 91 to pass over the second end plate 50 as shown in FIGS. 17 and 18, allowing the sliding board 60 to be continuously moved in the second direction D2. FIG. 19 shows the second sliding blocks 75 of the second guide rails 70 that are provided at the bottom wall of the sliding board 60 are stopped at the first end plate 40. At this time, the sliding board 60 is stopped from displacement in the second direction D2.

As indicated above, when moving the sliding board 60 from the limited position in the first direction D1 toward the second direction D2, the linking rod 91 works as intermediate means to move the guide rods 30 simultaneously, preventing the movement of the sliding board 60 and the guide rods 30 from the extended position to the received position through a two-step movement.

Figure 20:
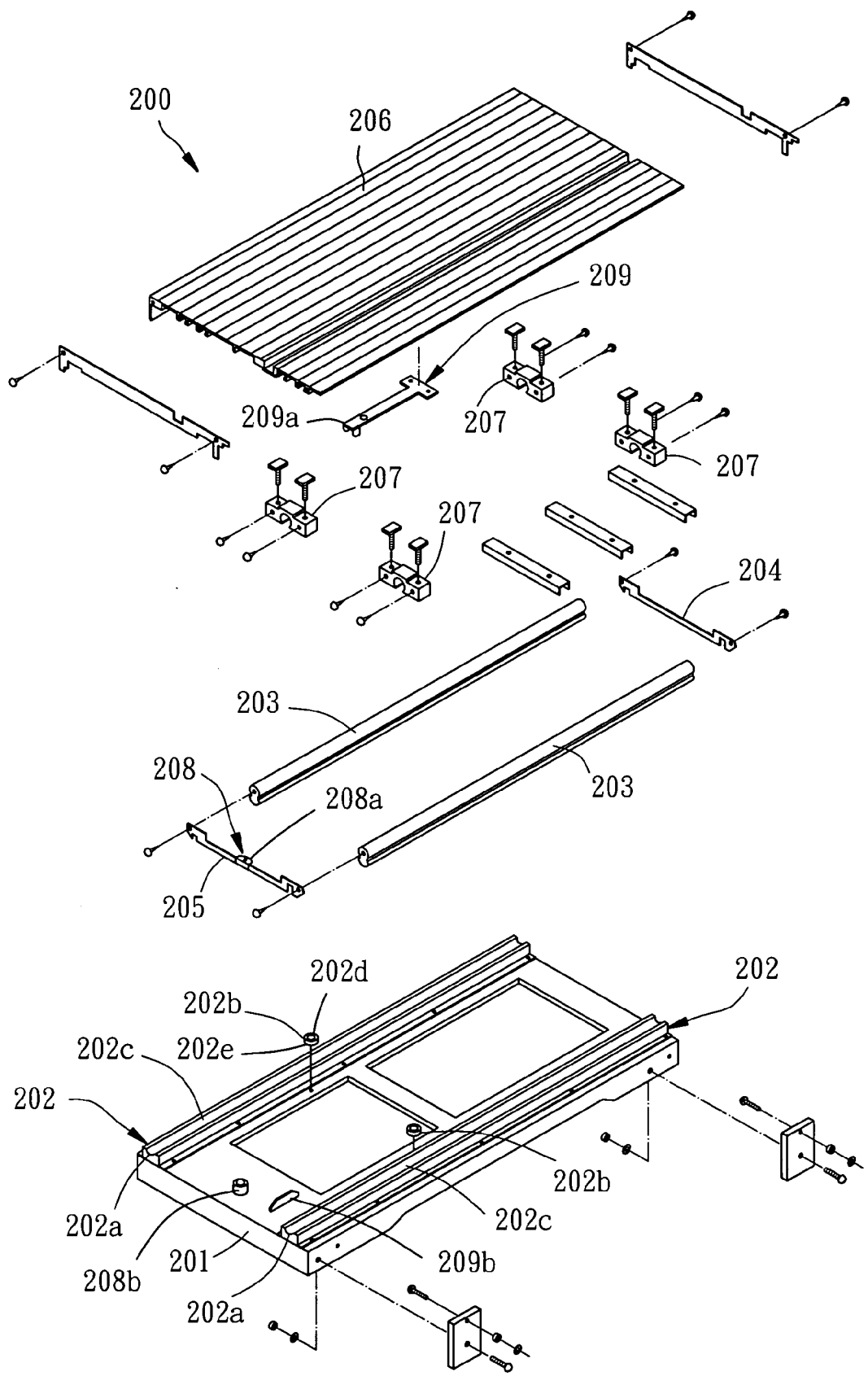
FIG. 20 is an exploded view of a worktable in accordance with a second embodiment of the present invention.

FIG. 20 shows a second embodiment of the present invention. According to this embodiment, the worktable, referenced by 200, is substantially similar to the aforesaid first embodiment of the present invention, comprising a base 201, two first guide rails 202, two guide rods 203, a first end plate 204, a second end plate 205, a sliding board 206, two second guide rails 207 each formed by two guide blocks, a brake 208, which comprises a retaining member 208a and a stop member 208b, and a linking mechanism 209, which is comprised of a linking rod 209a and a protruding block 209b. The relative positions and functioning of the component parts of this second embodiment are substantially similar to the like parts in the aforesaid first embodiment with the exception of the following differences.

According to this second embodiment, each first guide rail 202 is comprised of an elongated rail body 202a and a stop block 202b. The elongated rail body 202a has a recessed top wall defining a guide groove 202c. The stop block 202b has a first stop portion 202d at one side and a second stop portion 202e at the opposite side. The guide groove 202c guides sliding movement of the associating guide rod 203. The first stop portion 202d and second stop portion 202e are adapted to stop the first end plate 204 and the second end plate 205 respectively. This second embodiment achieves the same effect as the aforesaid first embodiment.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A worktable comprising:

a base;

at least one first guide rail affixed to said base, said at least one first guide rail each having a guide groove, a first stop portion, and a second stop portion;

at least one guide rod slidably coupled to the guide groove of said at least one first guide rail and axially movable in a first direction and a second direction opposite to said first direction, said at least one guide rod each having a first end and a second end;

a first end plate fixedly connected to the first end of said at least one guide rod for stopping against the first stop portion of said at least one guide rod to prohibit displacement of said at least one guide rod in said first direction;

a second end plate fixedly connected to the second end of said at least one guide rod for stopping against the second stop portion of said at least one guide rod to prohibit displacement of said at least one guide rod in said second direction;

a sliding board slidably supported on said at least one guide rod, said sliding board having a bottom wall;

at least one second guide rail affixed to the bottom wall of said sliding board, said at least one second guide rail each having a guide groove for receiving said at least one guide rod, a first push portion for stopping against said second end plate for enabling said at least one guide rod to be carried in said first direction when said sliding board is moved by an external force in said first direction, and a second push portion for stopping against said first end plate for enabling said at least one guide rod to be carried in said second direction when said sliding board is moved by an external force in said second direction; and a linking mechanism having a linking rod affixed to the bottom wall of said sliding board for stopping against said second end plate to move said at least one guide rod in said second direction when said sliding board is moved by an external force from said first direction toward said second direction.

2. The worktable as claimed in claim 1, wherein said at least one first guide rail each comprises a first locating block and a second locating block, said first locating block and said second locating block each defining a groove, the grooves of said first locating block and said second locating block constructing the guide groove of the first guide rail, said first locating block having a sidewall that forms the first stop portion of the first guide rail, said second locating block having a sidewall that forms the second stop portion of the first guide rail;

wherein said at least one second guide rail each comprises a first sliding block and a second sliding block, said first sliding block and said second sliding block each defining a groove, the grooves of said first sliding block and said second sliding block constructing the guide groove of the second guide rail, said first sliding block having a sidewall that forms the first push portion of the second guide rail, said second sliding block having a sidewall that forms the second push portion of the second guide rail;

wherein said at least one guide rod is inserted in the guide groove of said at least one first guide rail and the guide groove of said at least one second guide rail.

3. The worktable as claimed in claim 1, wherein said linking rod has a rear end fixedly connected to the bottom wall of the sliding board, and a front end having a hooked surface portion facing said second direction and an arched guide surface portion facing said first direction, said hooked surface portion being able to hook on said second end plate and to further carry said at least one guide rod when said sliding board is moved by an external force in said second direction, said arched guide surface portion being able to guide the front end of said linking rod over said second end plate when said sliding board is moved by an external force in said first direction.

4. The worktable as claimed in claim 3, wherein said linking mechanism further comprises a protruding block mounted on said base and provided with a sloping top surface, and said linking rod has a protruding portion touchable and moveable along the sloping top surface of said protruding block when said sliding board is moved toward said second direction so that said front end of said linking rod can be lifted to move over said second end plate when said linking rod moves along said sloping top surface of said protruding block.

5. The worktable as claimed in claim 1, further comprising a brake, said brake comprising:

a retaining member affixed to said second end plate, said retaining member having a retaining hole; and a stop member mounted in said base, said stop member having a part engaged into said retaining hole of said retaining member when said sliding board is moved to a limited position in said second direction.

6. The worktable as claimed in claim 5, wherein said brake further comprises a holder base fixedly mounted on said base and provided with a receiving hole, and a spring member mounted in said receiving hole of said holder base; said stop member is a steel ball supported on said spring member in said receiving hole of said holder base and forced partially out of said receiving hole of said holder base by said spring member.

7. The worktable as claimed in claim 1, wherein said at least one first guide rail each comprises an elongated rail body and a stop block, said elongated rail body having a recessed top wall defining the guide groove of the first guide rail, said stop block having a first side forming the first stop portion of the first guide rail and a second side forming the second stop portion of the first guide rail; said at least one second guide rail each comprises a first sliding block and a second sliding block, said first sliding block and said second sliding block each having a groove, the grooves of said first sliding block and said second sliding block constructing the guide groove of the second guide rail, said first sliding block having one sidewall that forms the first push portion of the second guide rail, said second sliding block having one sidewall that forms the second push portion of the second guide rail.

* * * * *